H. DAVIS.
STEAM-COOKER.
No. 173,448. Patented Feb. 15, 1876.
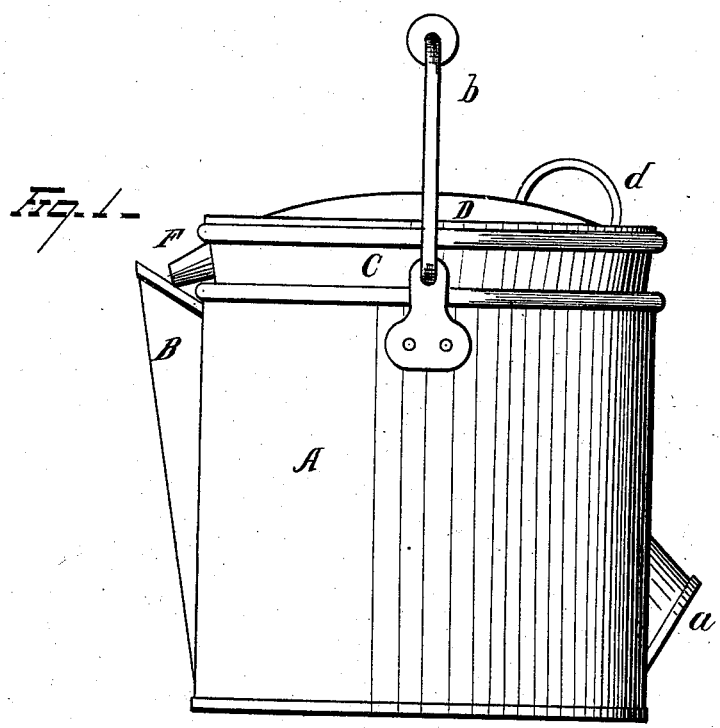
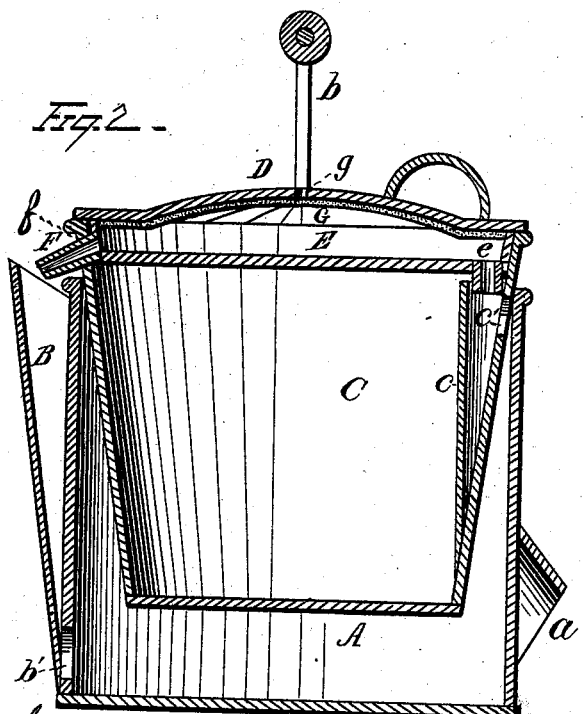
WITNESSES
E. I. Nottingham
F. O. M'Cleary
INVENTOR
Henry Davis
By Leggett & Leggett
Attorneys

UNITED STATES PATENT OFFICE.

HENRY DAVIS, OF ERIE, PENNSYLVANIA.

IMPROVEMENT IN STEAM-COOKERS.

Specification forming part of Letters Patent No. 173,448, dated February 15, 1876; application filed January 18, 1876.

*To all whom it may concern:*

Be it known that I, HENRY DAVIS, of Erie, in the county of Erie and State of Pennsylvania, have invented certain new and useful Improvements in Condensed Steam-Cooker; and I do hereby declare the following to be a full, clear, and exact description of the invention, such as will enable others skilled in the art to which it pertains to make and use it, reference being had to the accompanying drawings, which form part of this specification.

My invention relates to certain improvements in steam-cooking apparatus.

Heretofore steam-pans and cooking-utensils have been constructed with a water-vessel permanently attached thereto, and of a form to allow of only the bottom and sides of the vessel to be enveloped in steam.

The object of my invention is to produce a cooking apparatus in such a manner that every portion of the vessel within which the substance is baked or cooked may be completely surrounded by a steam-space; and to that end my invention consists in the several distinctive features which will more fully appear from the following description and claims.

Figure 1 is a side elevation of my cooking apparatus, and Fig. 2 is a vertical section of same.

The outer vessel A is provided with a bail, $a$, handle $b$, and a duct or spout, B, the latter serving to convey the condense water from the cover to the lower portion of the vessel A through opening $b'$ in the lower portion of the same. The interior or cooking vessel C is, preferably, of conical form, and has a tube, $c$, secured to its inner surface, the upper end of said tube terminating a little below the upper edge of the vessel. The tube $c$ connects with the interior of vessel A through opening $C'$. Cover D, provided with a handle, $d$, is formed with a steam-space, E, steam being admitted to the same through the short depending tube $e$, which registers and enters tube $c$ of vessel C as the cover is placed in its proper position on said vessel. Water of condensation, as it forms in the steam-space of the cover, is conveyed through spout F into the duct B of vessel A. The spout F is situated directly opposite the tube $e$; therefore, to secure the cover to the vessel B, the spout is first inserted in the opening $f$ of said vessel, and the tube $e$ is then forced into the tube $c$ of vessel C, thereby forming a continuous steam passage and space completely around the bottom, sides, and top of vessel B. Within the upper portion of the cover there is placed a layer of plaster-paris or other non-conducting substance, G, to prevent the undue heating of the top of the cover. A vent-hole, $g$, is formed in the top of the cover, so that air may circulate above the non-conducting substance, and thereby prevent its being continuously saturated with moisture, and allow of its deposition on the top of cover D.

Any article of food, when placed within a steam-cooking apparatus constructed as herein described, will be subjected to an even and equalized temperature around its entire surface, and thereby be evenly and thoroughly cooked or baked.

Having clearly described my invention, what I claim, and desire to secure by Letters Patent, is—

1. The combination of receptacle C, having a tube, $c$, and opening $f$, with the cover D, provided with tube $e$ and spout F, substantially as and for the purpose set forth.

2. The combination, with receptacle A having duct B and opening $b'$, vessel or receptacle C provided with tube $c$ and opening $f$, of the cover D formed with a tube, $e$, and spout F, substantially as and for the purpose set forth.

3. The combination of the non-conductor G with cover D, the same provided with a steam-space, E, substantially as and for the purpose specified.

In testimony whereof I have signed my name to this specification in the presence of two subscribing witnesses.

HENRY DAVIS.

Witnesses:
  H. T. HOWER,
  FRANCIS TOUMEY.